Mar. 3, 1925.
E. SCHMIDT
DEVICE FOR THE MEASUREMENT OF HEAT
Filed June 11, 1923
1,528,383
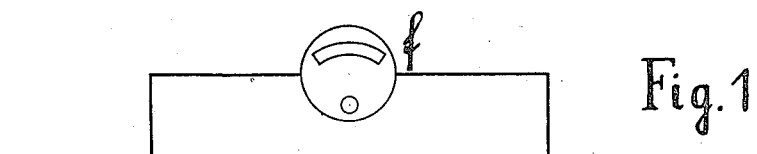
Fig.1
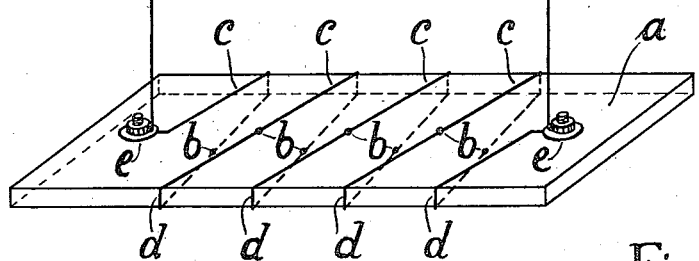
Fig.2
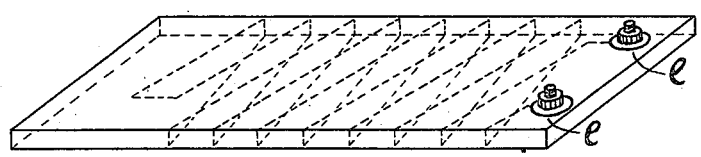
Fig.3
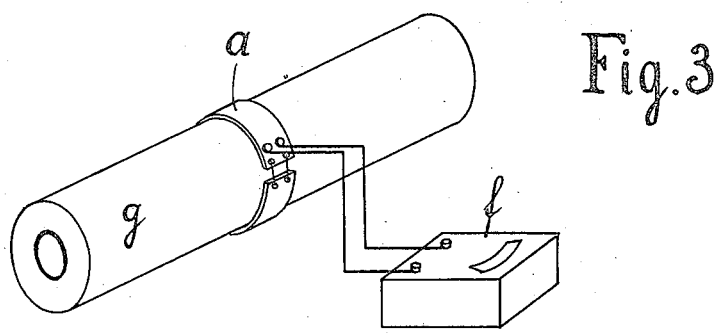

Patented Mar. 3, 1925.

1,528,383

UNITED STATES PATENT OFFICE.

ERNST SCHMIDT, OF MUNICH, GERMANY.

DEVICE FOR THE MEASUREMENT OF HEAT.

Application filed June 11, 1923. Serial No. 644,772.

*To all whom it may concern:*

Be it known that I, ERNST SCHMIDT, a citizen of the German Empire, residing at Munich, Bavaria, Germany, have invented certain new and useful Improvements in a Device for the Measurement of Heat, of which the following is a specification.

My invention relates to a method of and device for the measurement of heat, and it has particular relation to a method and device whereby the heat losses from certain bodies, such as steam pipes, furnaces, the walls of heated buildings, refrigerating chambers, etc., may be measured.

The measurement of such heat flow or losses, that is of the currents of heat which pass through such solid bodies by means of conduction, is difficult and can only be accomplished by utilizing relatively intricate experimental arrangements. It follows of course that these latter cannot be easily applied to bodies, the heat flow from which is to be measured, and my invention has for its object, therefore, the provision of a device which measures such heat flow or current in a relatively simple manner without the necessity of any modification or change in the bodies, the heat flow from which is to be measured.

In order to clearly illustrate my invention I have hereafter described the same in connection with the accompanying drawing, in which:

Figure 1 is a diagrammatic view illustrating the principle of the device;

Fig. 2 is a view of a structure actually embodying my invention; and,

Fig. 3 illustrates the invention embodied in a flexible device whereby the latter may be used for measuring the heat flow from curved bodies, such for instance as steam pipes.

Assuming, for example, that it is desired to measure the quantity of heat which passes through the wall of a heated building and leaves its surface, under such circumstances I may embody my invention in a thin plate-like member, which may be called a measuring plate. Such plate is pressed against the wall of the building, or other body, the heat flow from which is to be measured, whereupon the heat current to be measured also passes through the plate-like member. This latter member must, of course, be relatively thin and of such small heat insulation effect that it does not materially vary the heat current flowing from said wall. In this connection a plate of glass, india rubber, or any other material, varying in thickness from one to several millimeters, may be used as the measuring plate.

The passage of the heat through the aforesaid plate is accompanied by a small difference in temperature between the two surfaces, since heat conduction is only possible because of the existence of a temperature gradient, or heat difference. This temperature difference, which is proportional to the heat flow through the measuring plate, may be used to measure the quantity of heat which leaves the wall, or other bodies, per unit of time and per unit of surface.

My invention contemplates that the heat conductivity of the plate, as well as its thickness, is known, whereby the constants derived therefrom may be used in an indicating instrument to measure directly the heat flow in predetermined heat units.

The temperature difference between the two sides of the measuring plates is of course quite small, but by utilizing thermo-electric means, for instance, thermo-electric couples comprising copper and constantan wires, the hot junctions of these two wires being arranged on one side of the plates and the cold junctions being arranged on the opposite sides of the same, a sufficient electromotive force is produced to register. The aforesaid thermo-electrical force can be increased by using a plurality of thermo-couples, the latter being joined together in a thermo-pile, and the connections, or solderings between the wires, being fixed alternately on opposite sides of the plate. The ends of the said pile are connected with a suitable electrical instrument, such for instance, as a galvanometer, or a millivolt ammeter, the scale of the instrument used being calibrated by reason of the knowledge of the constants of the plate, as heretofore pointed out, so that the loss of heat per hour per square foot is directly indicated thereon in heat units.

Where an excessive heat emission is to be measured, the measuring elements on the opposite sides of the measuring plate may be covered with an insulating layer which not only functions to prevent damage because of heat, but serves the purpose of electrically insulating the turns of wire. The same purpose is served by embedding the wires and couples in the material of the plate itself. This plate may be of rubber and covered with an insulating material, or rubber linen which material lends itself particularly well to the formation of a desirable heat measuring device because the rubber linen can be fixed on the foundation plate by vulcanization.

Moreover, I hereafter describe my invention as embodied in a flexible measuring plate provided with hooks and eyes and so arranged that said plate may be utilized in measuring the heat flow from curved surfaces in general, such for instance as pipe lines. Under such circumstances the plate is made in the form of a strip or band of flexible material such as leather or rubber.

In the drawings heretofore referred to, my improved device comprises a measuring plate *a* upon which is arranged a plurality of thermo-couples. The latter consists of alternate wires of copper *c* and constantan *d* connected or soldered together at *b*. Binding posts *e* are provided at the ends of the thermo-pile thus formed, whereby suitable lead wires may connect the said pile to an electrical indicating instrument *f*.

While I have shown the pile in Fig. 1 as applied to the plate in a spiral form it may of course be arranged in any other suitable way.

In Fig. 2 I have illustrated the manner in which the wires and connections of the pile may be embedded for insulation purposes, the connecting binding posts being brought out to the surface.

In Fig. 3 I have illustrated my invention as embodied in a flexible band *a* which may be placed around a curved surface, shown for purposes of illustration as a pipe line. By knowing the constants of the pile thus employed the heat loss may be directly indicated by a galvanometer, or any other suitable instrument, *f*.

While I have above described my invention with respect to a specific embodiment thereof, it is to be understood that I do not wish to limit the same to use in this connection, but desire that my invention be limited by the prior art and the scope of the appended claims.

Having described my invention, what I claim as new and desire to secure by Letters Patent of the United States is:

1. In a device for measuring the heat flow from bodies, a member having flat surfaces, one surface of which is applied to the body, the heat flow from which is to be measured, thermal-electric means associated with the opposite surfaces of said members and adapted to respond to temperature differences between the surfaces of said member, and means connected in series with said thermo-electric means and calibrated to indicate the degree of said response.

2. In a device for measuring the heat flow from bodies, a member having flat surfaces, said member being flexible to permit of its being wrapped around a body, the heat flow from which is to be measured, thermo-electric means associated with the opposite surfaces of said member and adapted to respond to temperature differences between the surfaces of said member, and means connected in series with said thermo-electric means and calibrated to indicate the degree of said response.

3. In a device for measuring the heat flow from bodies, a member having flat surfaces, one surface of which is applicable to the body the heat flow from which is to be measured, thermo-electric means associated with said member and adapted to respond to temperature differences between the surfaces of said member, means calibrated to indicate the degree of said response, and electric conducting means embedded in said member to connect said thermo-electric means to said indicating means.

4. In a device for measuring the heat flow from bodies, a member having flat surfaces, one surface of which is applicable to the body, the heat flow from which is to be measured, means comprising thermo-electric couples secured to said member, an indicating instrument calibrated in predetermined units for indicating the effect of said heat flow on said elements, and electrical conducting means for connecting said elements to said instrument.

5. The method of measuring a heat loss from a body which comprises passing the heat escaping from said body through a thin flat member of known thickness and heat conductivity, causing the loss of heat in said thin member to generate an E. M. F. between a cold junction of a thermo-couple and a hot junction of said thermo-couple located on the opposite faces of said flat member, measuring said electric motive force caused by the temperature difference between the surfaces of said thin member.

6. In a device for measuring the heat flow from bodies, a member having flat surfaces and appreciable thickness, thermo-electric couples having the cold junction thereof on one surface of said member and the hot junction thereof on the opposite surface of the same, said thermo-couples being connected in series, and means connected to said couples for indicating the heat difference between the two surfaces of said member.

7. In a device for measuring the heat flow from bodies, a member having flat surfaces and appreciable thickness, thermo-electric couples having the cold junction thereof on one surface of said member and the hot junction thereof on the opposite surface of the same, said thermo-couples being connected in series, and means connected to said couples for indicating the heat difference between the two surfaces of said member, said thermo-couples being protected by an insulating covering.

8. In a device for measuring the heat flow from bodies, a member having flat surfaces and appreciable thickness, thermo-electric couples having the cold junction thereof on one surface of said member and the hot junction thereof on the opposite surface of the same, said thermo-couples being connected in series, and means connected to said couples for indicating the heat difference between the two surfaces of said member, said thermo-couples being protected by an insulating covering comprising a rubber-like material which is fastened to said member by vulcanization.

In testimony whereof I affix my signature in presence of two witnesses.

ERNST SCHMIDT.

Witnesses:
  A. DE LOHS,
  THEA J. KELLER.